US010752418B2

(12) United States Patent
Cameron et al.

(10) Patent No.: US 10,752,418 B2
(45) Date of Patent: Aug. 25, 2020

(54) FLUID DISTRIBUTION AND DISPENSING SYSTEM

(71) Applicant: CASTROL LIMITED, Reading (GB)

(72) Inventors: Ame Cameron, Wayne, NJ (US); Greg Saxon, Randolph, NJ (US)

(73) Assignee: Castrol Limited, Reading (GB)

( * ) Notice: Subject to any disclaimer, the term of this patent is extended or adjusted under 35 U.S.C. 154(b) by 152 days.

(21) Appl. No.: 15/631,609

(22) Filed: Jun. 23, 2017

(65) Prior Publication Data

US 2017/0369220 A1    Dec. 28, 2017

Related U.S. Application Data

(60) Provisional application No. 62/354,394, filed on Jun. 24, 2016, provisional application No. 62/431,939, filed on Dec. 9, 2016.

(51) Int. Cl.
*B67D 7/04* (2010.01)
*B65D 77/06* (2006.01)
*F16N 25/00* (2006.01)
*B67D 3/00* (2006.01)
*B65D 81/24* (2006.01)
(Continued)

(52) U.S. Cl.
CPC ......... *B65D 77/067* (2013.01); *B65D 81/245* (2013.01); *B67C 9/00* (2013.01); *B67D 3/0032* (2013.01); *B67D 3/0038* (2013.01); *B67D 3/0041* (2013.01); *B67D 3/0045* (2013.01); *B67D 7/04* (2013.01); *B67D 7/3209* (2013.01); *B67D 7/3254* (2013.01); *F16N 25/00* (2013.01); *F16N 35/00* (2013.01); *G01F 11/28* (2013.01); *B67C 2011/027* (2013.01);
(Continued)

(58) Field of Classification Search
CPC .. B65D 77/067; B65D 81/245; B67D 7/3254; B67D 7/3209; B67D 7/78; B67D 7/04; B67D 3/0045; B67D 3/0041; B67D 3/0038; B67D 3/0032; F16N 39/00; F16N 35/00; F16N 25/00; F01M 11/0458; G01F 11/28

See application file for complete search history.

(56) References Cited

U.S. PATENT DOCUMENTS 3,570,629 A * 3/1971 Dahm .................. F01M 11/061
                                                   184/103.2
4,082,163 A     4/1978 Takeishi
(Continued)

FOREIGN PATENT DOCUMENTS

CA    2122629       5/1993
CN    101909577    12/2010
(Continued)

OTHER PUBLICATIONS

The International Search Report with Written Opinion for PCT/IB2017/000910 dated Dec. 8, 2017, pp. 1-13.
(Continued)

*Primary Examiner* — Nicolas A Arnett
(74) *Attorney, Agent, or Firm* — McDonnell Boehnen Hulbert & Berghoff LLP

(57) ABSTRACT

A fluid storage and dispensing system that safely and efficiently stores all grades of motor oil is provided. The system is configured to accurately dispense motor oil into vehicles. The system may also be used for the storage of and dispensing of other fluids.

22 Claims, 7 Drawing Sheets

(51) Int. Cl.
    *B67C 9/00*         (2006.01)
    *G01F 11/28*      (2006.01)
    *F16N 35/00*      (2006.01)
    *B67D 7/32*        (2010.01)
    *B67C 11/02*      (2006.01)
    *B67D 7/78*        (2010.01)
    *F01M 11/04*      (2006.01)
    *F16N 39/00*      (2006.01)

(52) U.S. Cl.
    CPC ............ *B67D 7/78* (2013.01); *F01M 11/0458* (2013.01); *F16N 39/00* (2013.01)

(56) References Cited

U.S. PATENT DOCUMENTS

| | | | | |
|---|---|---|---|---|
| 5,975,360 | A * | 11/1999 | Ophardt | A47K 5/1205 222/83 |
| 5,988,456 | A * | 11/1999 | Laible | B67D 7/0294 222/464.1 |
| 6,702,160 | B1 * | 3/2004 | Griffith | B65D 1/06 222/481.5 |
| 7,597,124 | B2 * | 10/2009 | Litto | B67D 1/0878 141/114 |
| 8,528,795 | B2 * | 9/2013 | Law | G01F 11/04 222/477 |
| 9,433,960 | B2 * | 9/2016 | Law | G01F 11/263 |
| 10,071,836 | B2 * | 9/2018 | Holroyd | B65D 47/2018 |
| 2004/0217137 | A1 * | 11/2004 | Ophardt | A47K 5/1202 222/481.5 |
| 2008/0308183 | A1 | 12/2008 | Law | |
| 2012/0097714 | A1 * | 4/2012 | Hoefte | G01F 11/04 222/477 |

FOREIGN PATENT DOCUMENTS

| | | |
|---|---|---|
| CN | 103723362 | 4/2014 |
| DE | 3853063 | 8/1995 |
| EP | 0 342 078 A1 | 11/1989 |

OTHER PUBLICATIONS

Castrol 60070 GTX 10W-30 Motor Oil, 6 Gallon Enviro-Pack, retrieved from the internet: https://www.amazon.com/Castrol-60070-10W-30-Gallon-Enviro-Pack/dp/B008BOG1U0 on Jun. 4, 2019.

Castrol E-Pack Replaces Old Bulk Tanks in Walmart Tires & Lube Express, retrieved from the internet: http://www.scholleipn.com/castrol-e-pack-replaces-old-bulk-tanks-in-walmart-tire-lube-express/ on Jun. 4, 2019.

Castrol pack Drives new facility design for Walmart tire and lube, retrieved from the internet: https://www.greenerpackage.com/source_reduction/castrol_pack_drives_new_facility_design_walmart_tire_and_lube on Jun. 4, 2019.

\* cited by examiner

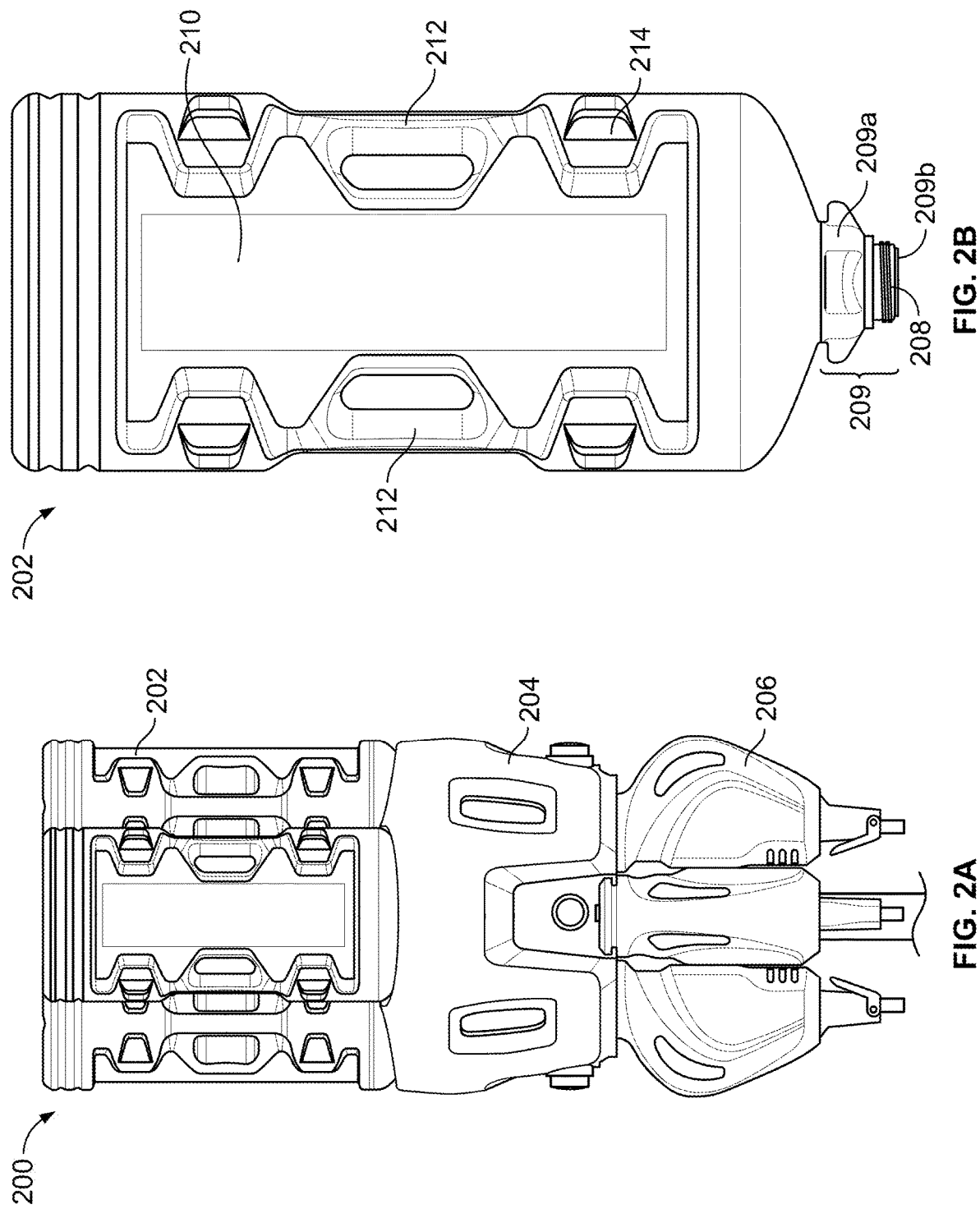

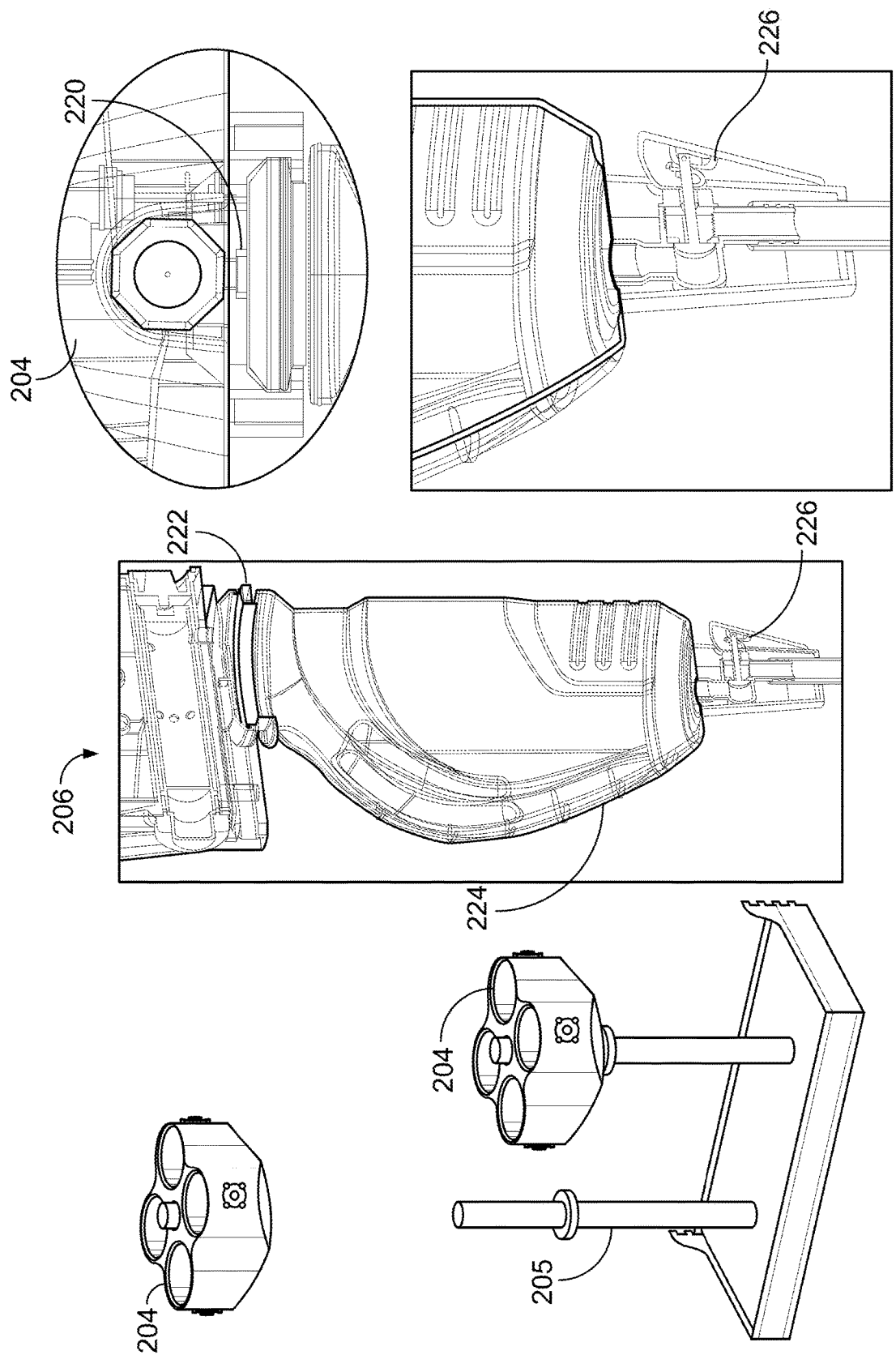

FLUID DISTRIBUTION AND DISPENSING SYSTEM

CROSS-REFERENCE TO RELATED APPLICATIONS

This application claims priority to U.S. Provisional Patent Application Nos. 62/354,394, filed Jun. 24, 2016, and 62/431,939, filed Dec. 9, 2016, which are hereby incorporated herein by reference in their entireties.

FIELD

The disclosure relates to a packaging and dispensing system for use in workshops and home garages to safely ship and store all grades of motor oil. The disclosure also relates to a system for safely, accurately, and quickly dispensing motor oil into car engines.

BACKGROUND

Current systems for storing and dispensing motor oil are not resilient enough to stand up to the environmental rigors of a garage. These systems also are not fully recyclable, lead to cross-contamination, do not allow the user to completely empty the oil out of the package, and do not accurately dispense the oil into the pitcher. The current systems lead to inherent underlying inventory inaccuracies due to the inability to accurately measure the amount of fluid remaining.

Current systems include the Castrol® enviro-Pack ("ePack") system and "Bag in a Box" products." The "Bag in a Box" system is not fully recyclable because the film used for the bag is not recyclable. The "Bag in a Box" system also lends itself to cross-contamination of fluids because users can use any dosing device (e.g., pitcher) they prefer, regardless of whether it was used for the same fluid in the past. The "Bag in a Box" system also does not allow the user to completely empty all of the motor oil out of the package as some oil remains in the bag.

Thus, there is a need for a fully recyclable system for storing and accurately dispensing fluids such as motor oil. The system also needs means to prevent cross-contamination of fluids. Furthermore, the system and method of use needs to be ergonomically friendly.

SUMMARY

In one aspect, a fluid dispensing system is disclosed. The fluid dispensing system comprises a container comprising an open end, wherein fluid is provided within the container; a dosing mechanism associated with the container; and a fluid receptacle, wherein the fluid receptacle is releasably engageable with the container or the dosing mechanism; wherein actuating the dosing mechanism releases a dose of fluid from the container into the fluid receptacle.

In another aspect, a fluid dosing system is disclosed, wherein the dosing mechanism is provided with a cup feature comprising a first region forming the base of the cup feature and a second region forming the rim of the cup feature, wherein the cup feature contains a volume of fluid and wherein the open end of the container is positionable submerged in the volume of fluid in the first region of the cup feature to form a hydrostatic seal.

In another aspect, a fluid dosing system is disclosed, wherein the first region of the cup feature retains a volume of fluid when the open end of the container is removed.

In another aspect, a fluid dosing system is disclosed, wherein the cup feature is provided with a piercing member disposed centrally within the cup feature in order to pierce the pierce-able membrane as the open end of the container is inserted into the dosing mechanism.

In another aspect, a fluid dispensing system is disclosed, wherein the dose of fluid is a fixed dose of fluid, and wherein the fixed dose of fluid is set by the dosing mechanism.

In another aspect, a fluid dispensing system is disclosed, wherein the dose of fluid is set by a user.

In another aspect, a fluid dispensing system is disclosed, wherein the dosing mechanism is connected to the open end of the container, wherein the open end of the container comprises a pierce-able membrane, and wherein the dosing mechanism punctures the pierce-able membrane when connected to the container.

In another aspect, a fluid dispensing system is disclosed, wherein the container comprises a crushable fluid reservoir.

In another aspect, a fluid dispensing system is disclosed, wherein the container is oblong.

In another aspect, a fluid dispensing system is disclosed, wherein the container is conical.

In another aspect, a fluid dispensing system is disclosed, wherein the container comprises at least one handle.

In another aspect, a fluid dispensing system is disclosed, wherein the container comprises an integrated measuring indicator.

In another aspect, a fluid dispensing system is disclosed, wherein the dosing mechanism comprises a non-rotatable switch.

In another aspect, a fluid dispensing system is disclosed, wherein the dosing mechanism comprises a rotatable switch.

In another aspect, a fluid dispensing system is disclosed, wherein the switch is configured to have a first position and a second position.

In another aspect, a fluid dispensing system is disclosed, wherein the first position of the switch is configure to prevent the fluid from entering the fluid receptacle, and in the second position, the switch is configured to enable the fluid to flow into the fluid receptacle.

In another aspect, a fluid dispensing system is disclosed, wherein the switch is configured such that a first activation initiates the flow of fluid into the fluid receptacle and a second activation terminates the flow of fluid into the fluid receptacle.

In another aspect, a fluid dispensing system is disclosed, wherein the switch is configured such that the fluid is dispensed only when the switch is held in the second position.

In another aspect, a fluid dispensing system is disclosed, wherein the switch is a push button, a rocker switch or a sliding switch.

In another aspect, a fluid dispensing system is disclosed, wherein the dosing mechanism comprises one of: a keypad, a touch-sensitive screen, a dial, or a lock mechanism.

In another aspect, a fluid dispensing system is disclosed, wherein the dosing mechanism comprises a valve positioned between the container and the fluid receptacle, and actuating the switch actuates the valve.

In another aspect, a fluid dispensing system is disclosed, wherein the container and/or the fluid receptacle are manufactured from an oleophobic material.

In another aspect, a fluid dispensing system is disclosed, wherein the fluid is lubricating motor oil.

In another aspect, a fluid dispensing system is disclosed, wherein the container comprises a first coding feature indicating the type of fluid provided within the container, the dosing mechanism comprises a second coding feature and the fluid receptacle comprises a third coding feature, and wherein the first coding feature, second coding feature and third coding feature match.

In another aspect, a method of dispensing a fluid using the fluid dispensing system is provided.

In another aspect, a fluid dispensing system is disclosed, comprising a container comprising an open end, wherein a fluid is provided in the container, and a dosing mechanism associated with the container, wherein the dosing mechanism is provided with a cup feature, the cup feature comprising a first region forming the base of the cup feature and a second region forming the rim of the cup feature, wherein the cup feature contains a volume of fluid and wherein the open end of the container is positionable submerged in the volume of fluid in the first region of the cup feature to form a hydrostatic seal.

In another aspect, a fluid dispensing system is disclosed, wherein the first region of the cup feature retains a volume of fluid when the open end of the container is removed.

In another aspect, a fluid dispensing system is disclosed, wherein the cup feature is provided with a piercing member disposed centrally within the cup feature in order to pierce the pierce-able membrane as the open end of the container is inserted into the dosing mechanism.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the invention. No attempt is made to show structural details of the invention in more detail than may be necessary for a fundamental understanding of the invention and various ways in which it may be practiced.

FIG. 2A shows a system of the present disclosure, according to an example embodiment.

FIG. 2B shows a container, according to an example embodiment.

FIG. 2F shows a dosing mechanism attached to a pole, according to an example embodiment.

FIG. 2G shows a fluid receptacle with a valve release trigger, according to an example embodiment.

DESCRIPTION

I. Introduction

Systems and methods for packaging/storing and dispensing a fluid, such as lubricating motor oil, are described herein. In particular, embodiments may take the form of or relate to a system comprising a container, a dosing mechanism, and a fluid receptacle. The system may be vertically positioned such that the fluid receptacle is gravity filled. The system may be reusable (i.e., refillable) or disposable.

The present disclosure has advantages over current systems for dispensing lubricating motor oil because it is fully recyclable, utilizes coding features or labels to help eliminate cross-contamination issues, and allows the user to completely empty the container of motor oil. The present system is also ergonomically friendly.

Figure 1A:
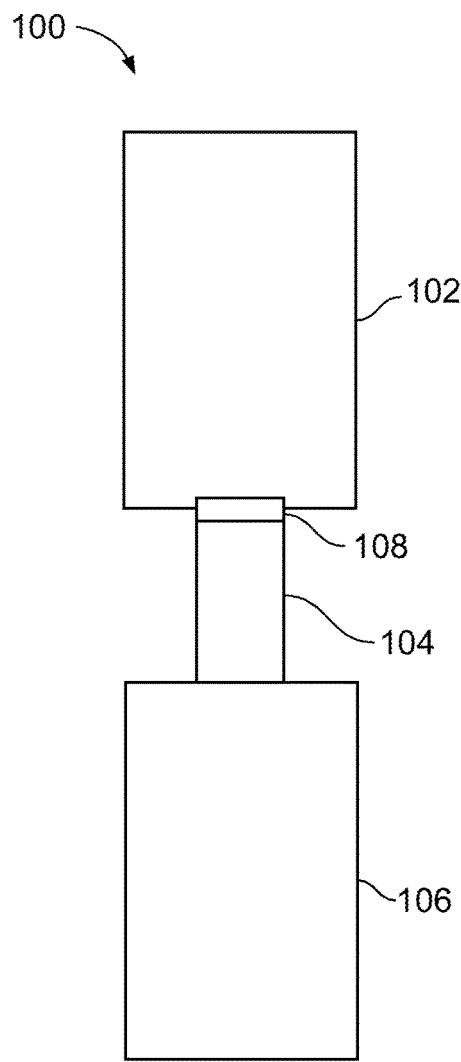
FIG. 1A shows a high-level view of a system of the present disclosure, according to an example embodiment.

In high-level illustrative implementation, as shown in FIG. 1A, a fluid dispensing system 100 may comprise a container 102, a dosing mechanism 104, and a fluid receptacle 106. The container 100 may comprise at least one open end 108 located at the bottom of the container 102. The open end 108 may be covered by a membrane or other pierce-able cover, or by a removable or re-usable cap or cover. A fluid, such as motor oil, may be provided within the container 102. The fluid dispensing system 100 may also be used to store and dispense other fluids, such as transmission fluids, brake fluids, and other ancillary automotive fluids. The dosing mechanism 104 may be releasably connected to the container 102. In an example embodiment, the dosing mechanism 104 is connected to the container at the open end 108. The container 102 may be inserted into the dosing mechanism 104 and the dosing mechanism 104 may puncture the membrane at the open end 108 of the container 102. The open end 108 may comprise a neck and the container 102 may be releasably locked into place at the neck. The dosing mechanism 104 may also be released to remove the container 102. The dosing mechanism 104 may be configured to dispense a fixed dose of the fluid from the container 102. Thus, the fluid receptacle 106 may be removed by a user in order to dispense the fluid into its desired location, e.g., to dispense motor oil into an automobile. The dosing mechanism 104 may provide the fixed dose of fluid into the fluid receptacle 106. Fluid is only dispensed from the container 102 into the fluid receptacle 106 when the dosing mechanism 104 is in place. The fluid receptacle 106 may include a fluid level indicator in order to determine how much fluid is contained within. In practice, a user would fill the fluid receptacle 106 with the desired amount of fluid and then evacuate the entire amount. In alternative embodiments, the user may empty less than the entire amount of the receptacle.

Figure 1B:
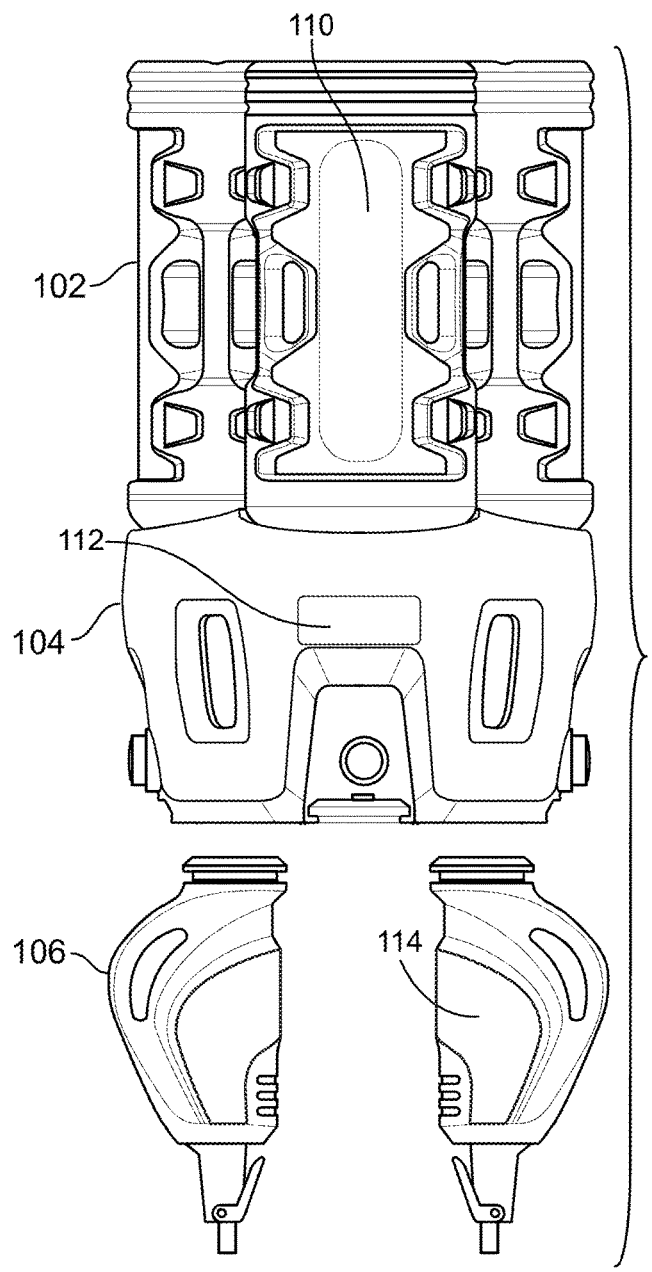
FIG. 1B shows a dosing mechanism and a fluid receptacle, according to an example embodiment.

In one embodiment, shown in FIG. 1B, the container 102 may comprise a first coding feature 110. The dosing mechanism 104 may also comprise a second coding feature 112 and the fluid receptacle 106 may comprise a third coding feature 114. The coding features 110, 112, and 114 may be labels indicating the type of fluid. These labels may help to avoid cross contamination as the user will be instructed only to use a container 102, dosing mechanism 104, and fluid receptacle 106 with matching labels. The coding features or labels may include unique colors and text. In other embodiments, the coding features or labels may be in Braille.

The container 102 may comprise a blow molded crushable fluid reservoir, such as a blow molded environmentally sustainable fluid reservoir. In other embodiments, the container 102 may be an extruded container. The container 102 may be any shape that can hold a fluid, such as oblong, cylindrical, conical, or square. The container 102 may comprise at least one handle. The handle may be located on the sides or top of the container 102. The container 102 may also comprise an integrated measuring indicator. The integrated measuring indicator may be provided on the outside of the container.

In an example embodiment, the fluid receptacle 106 may comprise a trigger and a valve. The trigger may be configured to open and close the valve. In other embodiments, the fluid receptacle 106 may comprise a manual valve. The fluid receptacle 106 may also comprise an integrated measuring indicator. The integrated measuring indicator may be provided on the outside of the container.

The fluid receptacle 106 may be in suspended attachment with the dosing mechanism 104, meaning that the fluid receptacle 106 is not attached to a wall or other support. The dosing mechanism 104 may comprise a wall mount bracket for mounting the dosing mechanism 104 to a wall or attached to other dosing mechanisms and be capable of spinning on a pole. This configuration may allow for the suspended attachment of the fluid receptacle 106.

The dosing mechanism 104 may comprise a dispensing dial for dispensing a fixed dose of fluid into the fluid receptacle 106. The dispensing dial may be a manual dispensing dial or a metered dispensing dial.

In an example embodiment, the container 102, reservoir of the dosing mechanism 104, and/or the fluid receptacle 106 may be manufactured from an oleophobic material, such a naturally oleophobic material like HDPE. In alternative embodiments, the container 102, reservoir of the dosing mechanism 104, and/or the fluid receptacle 106 may have a non-stick internal coating, for example, LiquiGlide™ or other coatings known in the art.

Figure 1C:
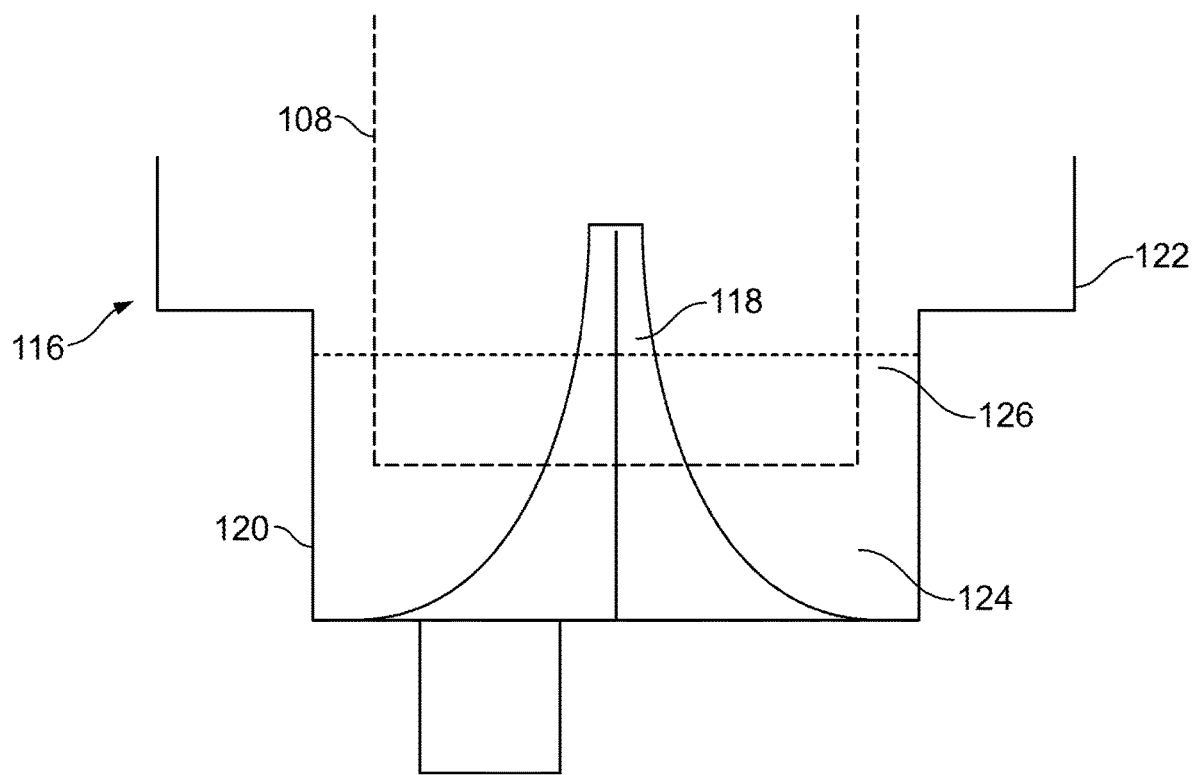
FIG. 1C shows a cup arrangement for creating a hydrostatic seal, according to an example embodiment.

Various valve mechanisms may be used to retain the fluid in the container 102 once it is connected to the dosing mechanism 104, as is shown in FIG. 1C. Typically in use the container 102 will be positioned substantially vertically with the open end 108 positioned vertically downwards in the dosing mechanism 104 to enable fluid to flow via gravity (as shown by dashed lines in FIG. 1C). Alternatively a pump mechanism may be used to create a pressure within the container 102 to force the fluid to flow out of the open end 108. One particularly advantageous mechanism is to exploit a hydrostatic seal to maintain the fluid within the container 102.

The hydrostatic pressure is the total pressure caused by the weight of the body of fluid within the container 102 against the open end 108. As the volume of fluid decreases during dispensing, the hydrostatic pressure also increases due to the reduction in weight of fluid in the container 102. In order to create a hydrostatic seal, the dosing mechanism is provided with a cup feature 116 into which the open end 108 of the container 102 is inserted. As described above, the open end 108 may be provided with pierce-able membrane or other cover to retain the fluid within the container 102 before use. The cup feature 116 is provided with a piercing member 118 disposed centrally within the cup in order to pierce the pierce-able membrane as the open end 108 of the container 102 is inserted into the dosing mechanism 104. The cup feature 116 comprises a first region 120 forming the base of the cup feature 116 and a second region 122 forming the rim of the cup 116. A volume of fluid 124, for example, 7 ounces (200 ml), is retained within the first region 120 of the cup feature 116. The open end 108 of the container 102 is positionable submerged in the volume of fluid in the first region of the cup to form a hydrostatic seal. The first region 120 of the cup feature 116 retains a volume of fluid when the open end 108 of the container 102 is removed.

In use, once the pierce-able membrane on the open end 108 of the container 102 has been pierced and the container 102 inserted fully into the dosing mechanism 104, the open end 108 of the container 102 is submerged below the surface 126 of the volume of fluid 124. This ensures that the fluid within the container 102 does not leak out since the hydrostatic pressure of the fluid coupled with the submersion of the open end 108 of the container 102 creates a hydrostatic seal. As the fluid drains out of the container 102 during use, not only does the hydrostatic pressure decrease, if the container comprises a crushable fluid reservoir the container 102 may begin to crease and collapse, ready for removal from the dosing mechanism 104 for disposal and/or recycling. When the container 102 is removed or inserted from the dosing unit a small volume of fluid (sufficient to form a further hydrostatic seal with a full container 102) remains in the cup feature 116.

II. Example Systems

Example configurations for fluid dispensing systems are illustrated in FIGS. 2A-G.

Figure 2C:
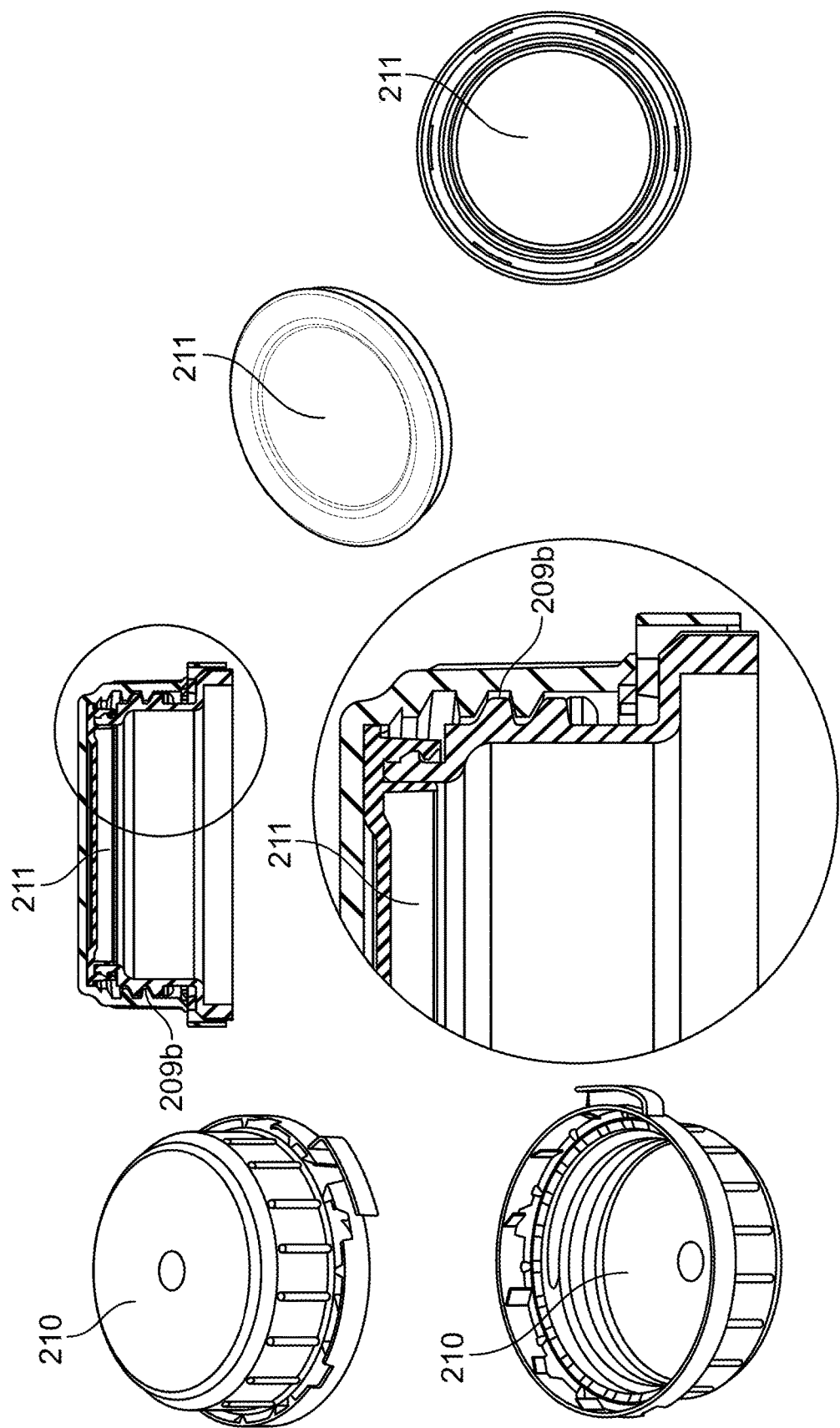
FIG. 2C shows an overcap and membrane assembly, according to an example embodiment.

As shown in FIGS. 2A-G, fluid dispensing system 200 may comprise a container 202, a dosing mechanism 204, and a fluid receptacle 206. In some embodiments, the fluid dispensing system 200 may comprise a plurality of containers 200, a dosing mechanism 204, and a plurality of fluid receptacles 206. The dosing mechanism 204 may releasably connect the plurality of containers 200 to the plurality of fluid receptacles 206. For example, the fluid dispensing system 200 may comprise four containers 200, a dosing mechanism 204 with four cavities for insertion of the four containers, and four fluid receptacles 206. A plurality of fluid dispensing systems 200 may also be provided. The container 202 may be a light-weight, crushable fluid reservoir 214 (see FIG. 2B). The container 202 may be a tall, vertical, oblong comprising an open end 208 with a plurality of handles 212. The open end 208 may be located at the end of a neck 209. The neck 209 may comprise a top portion 209*a* and a bottom portion 209*b*. The bottom portion 209*b* may be threaded in order to releasably connect the container 202 to the dosing mechanism 204. FIG. 2C shows a cap or overcap 210 that may be threadably connected to the bottom portion 209*b* before the container 202 is connected to the dosing mechanism 204. The bottom portion 209*b* may also include a pierce-able membrane 211.

The container 202 may include an integrated measuring indicator 213 on the container 202 (see FIG. 2D) in order to measure how much fluid is in the crushable fluid reservoir 214. In some embodiments, the integrated measuring indicator 213 is located on at least one of the plurality of handles 212, as shown in FIG. 2D. The container 202 may also include labeling to indicate the brand and weight of the oil. The coding features or labels may include unique colors and text. In other embodiments, the coding features or labels may be in Braille.

Figure 2E:
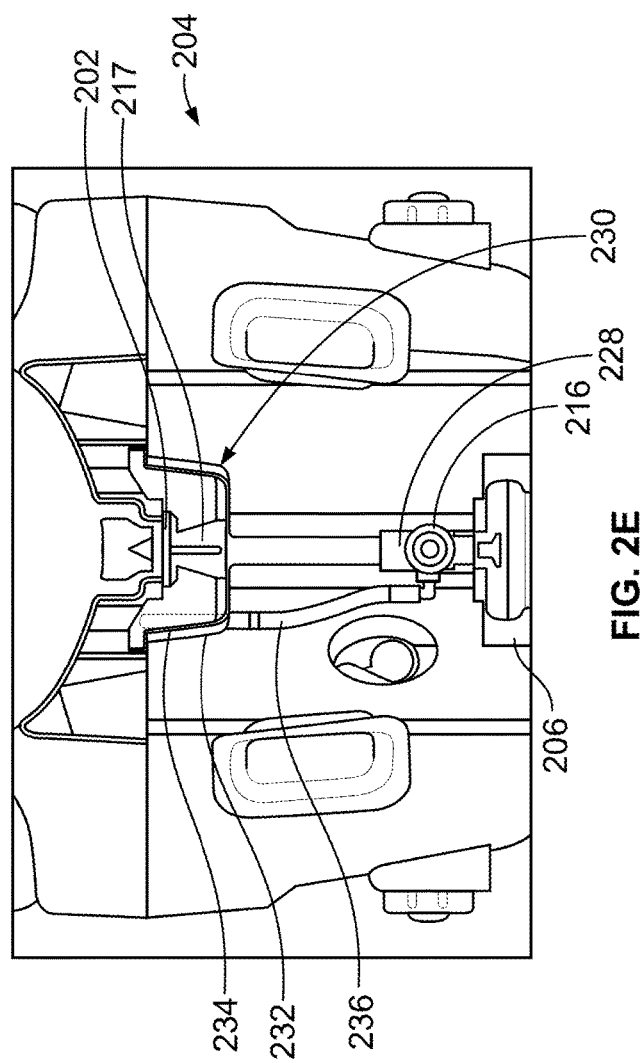
FIG. 2E shows a dosing mechanism, according to an example embodiment.
Figure 2D:
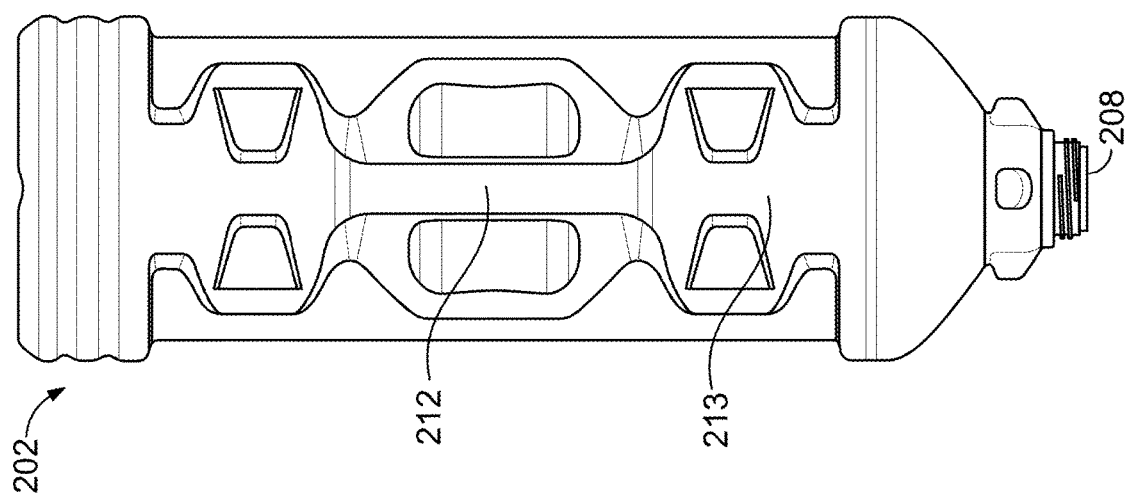
FIG. 2D shows a container, according to an example embodiment.

The dosing mechanism 204 of this example is shown in FIG. 2E. The dosing mechanism 204 may be attached to the open end 208 of the container 202. The dosing mechanism 204 may include a piercing member 217 to puncture or pierce the pierce-able membrane 211 of the container 202. The dosing mechanism 204 may include a switch 216 for dispensing a fixed dose of fluid into the fluid receptacle 206. In this example, the switch 216 is a non-rotatable switch. The switch 216 may be configured to have a first position and a second position. This could be where a push-button is used, such that the first position is the push-button in an un-pushed or non-actuated state, and the second position is where the push-button is pushed in, or in an actuated stated. In the first position, the switch 216 may be configured to prevent the fluid from entering the fluid receptacle 216, and in the second position, the switch 216 is configured to enable the fluid flow into the fluid receptacle 206. Alternatively, in another example, the switch 216 is configured such that a first activation initiates the flow of fluid into the fluid receptacle 206, and a second activation terminates the flow of fluid into the fluid receptacle 206. For a push-button this would be the equivalent of pushing the push-button into an actuated position and holding the push-button down in the actuated position until the correct volume of fluid is obtained at which point the push-button is released into a non-actuated position and the flow of fluid ceases. Therefore in this example, the switch 216 is configured such that the fluid is dispensed only when the switch 216 is held in the second position. The push-button may be one of: a push button, a rocker switch or a sliding switch. In a further example, the dosing mechanism 204 may comprise a valve 228 positioned between the container 202 and the fluid receptacle 206, such that actuating the switch 216 actuates the valve 228. The switch 216 may be one of a push-button, a rocker switch or a slider, and the push-button used in the examples above may be easily replaced by a rocker switch or a slider. Other mechanisms may be used to provide a switch. For example, the switch may also be a rotatable switch. Dispensing may occur by rotating or turning the switch. Additionally or alternatively, the dosing mechanism may also include one of: a keypad, a touchscreen, a dial, or a lock and key mechanism, as an alternative to the dial metered dosing mechanism above. Coding features may also be used, as described above. The container 202 comprises a first coding feature indicating the type of fluid provided within the container 202, the dosing mechanism 204 comprises a second coding feature and the fluid receptacle 206 comprises a third coding feature, and wherein the first coding feature, second coding feature and third coding feature match.

In some examples, the dosing mechanism 204 may be provided with an overflow arrangement 230. The piercing of the pierce-able membrane 211 by the piercing member 217 creates a hydrostatic seal between the dosing mechanism 204 and the container 202. Over time some fluid will escape the hydrostatic seal and needs to be collected for removal from the dispensing mechanism 204. This is done by providing an outer cup 232 and an inner cup 234, concentric with each other, such that overflow liquid first fills the inner cup 234 and then overflows into the outer cup 232. To make sure that the fluid is collected for removal and does not overflow onto the hands of a user of the system 200 or onto the floor or the fluid receptacle 206, an overflow pipe 236 is provided from the base of the outer cup 232 to below the valve 228 so that fluid can flow directly into the fluid receptacle 206.

The dosing mechanism 204 may also include a wall mount bracket 218. The wall mount bracket 218 may allow the entire system 200 to be mounted to a wall without separately mounting the container 202 and/or the fluid receptacle 206. In an alternative embodiment, FIG. 2F shows the dosing mechanism 204 attached to a pole 205 and resting on a ball bearing system to allow the entire fluid dispensing system 200 to spin and allow access to all four containers 200.

Fluid may be dispensed from the dosing mechanism 204 in volumes of 1, 2, 3, 4, 5, or 6 quarts (0.95, 1.89, 2.84, 3.79, 4.73, or 5.68 Liters). The dosing mechanism 204 may be a multi-chamber reservoir to allow for accurate dosing, as shown in FIG. 2E. The dosing mechanism 204 may include 1, 2, and 3 quart (0.95, 1.89, and 2.84 Liter) chambers. Walls 215a and 215b may divide the reservoir of the dosing mechanism 204 into three chambers 219a, 219b, and 219c (for example, chambers holding 1, 2, and 3 quarts (0.95, 1.89, and 2.84 Liters)). The user may press the switch 216 to dispense the fluid in a volume of 1, 2, 3, 4, 5, or 6 quarts (0.95, 1.89, 2.84, 3.79, 4.73, or 5.68 Liters), wherein the fluid will be dispensed from an individual chamber or combination of chambers.

In alternative embodiments, the fluid receptacle may be manually filled without using the dosing mechanism 204. In other embodiments, a user may control the dose set in the dosing mechanism. The user may "top off" or manually fill the fluid receptacle, but the fluid receptacle should be connected to the dosing mechanism 204 in order to allow manual filling. This helps to prevent cross-contamination.

FIG. 2G shows the fluid receptacle 206 of this example. The fluid receptacle 206 may include a top fill valve 220 with a gasket 222, which may be releasably engageable with the dosing mechanism 204. The fluid receptacle 206 may be in suspended attachment (i.e., attached to the dosing mechanism 204 which is attached to a wall or pole).

The fluid receptacle 206 may comprise at least one handle 224. In one embodiment, the handle 224 may provide an elbow style grip. A valve release trigger 226 may be provided on the handle to release the fluid receptacle 206 from the dosing mechanism 204 such that a user can use the fluid receptacle 206 to provide oil to a motor. The valve release trigger 226 may also be used by a user to dispense oil to the automobile.

III. Example Methods

Figure 3:
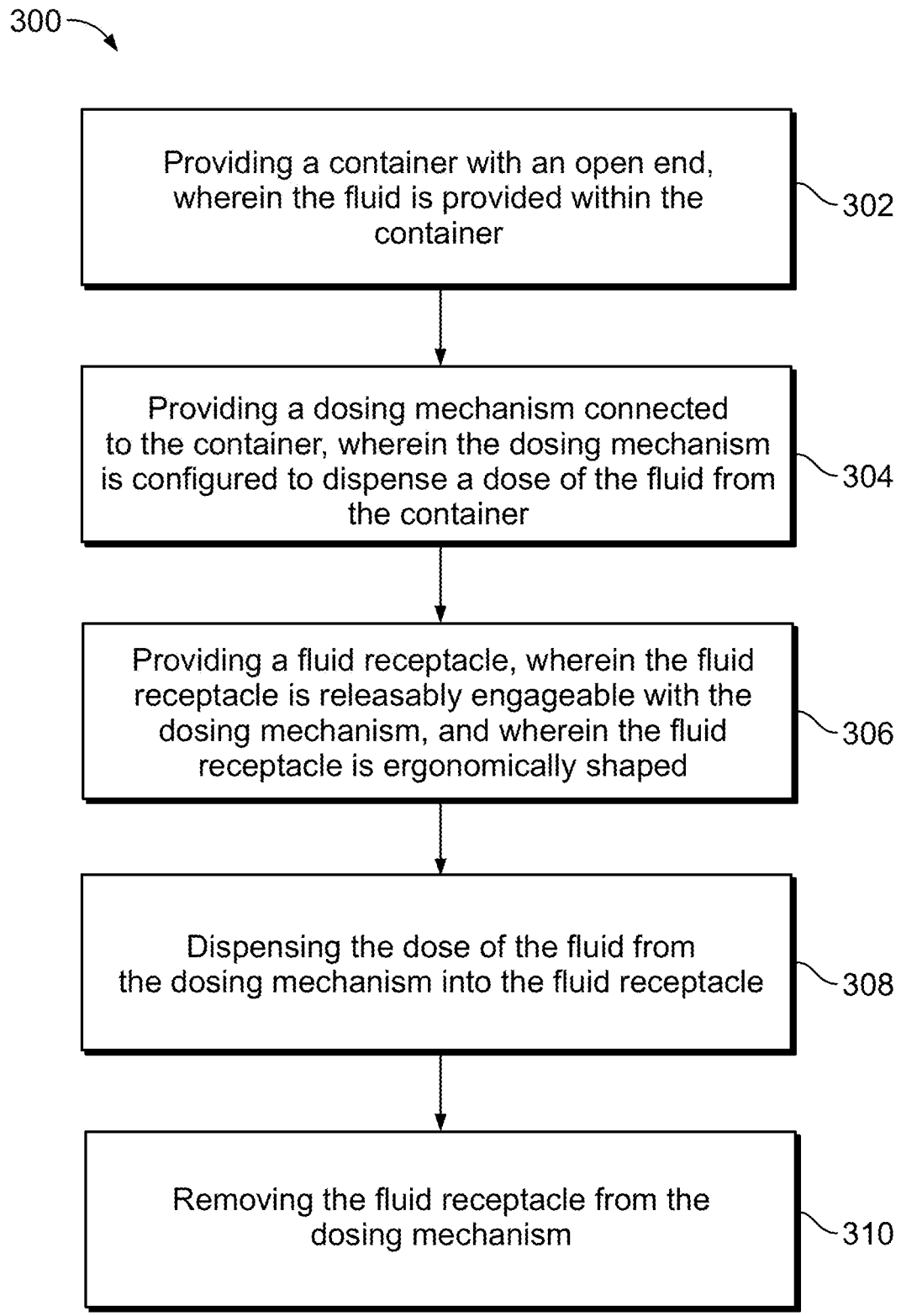
FIG. 3 shows a method dispensing a fluid, according to an example embodiment.

A method 300 of dispensing a fluid using the fluid dispensing system 100 is also provided, as shown in FIG. 3. The method may comprise step 302 of providing container 102 with an open end. The fluid may be provided within container 102. The method may also comprise the step 304 of providing the dosing mechanism 104 connected to the container 102. The dosing mechanism 104 may be configured to dispense a dose of the fluid from the container 102. The method further comprises the step 306 of providing the fluid receptacle 106. The fluid receptacle 106 may be releasably engageable with the dosing mechanism 104 and may be ergonomically shaped for ease of use. The method may also comprise the step 308 of dispensing the dose of the fluid from the dosing mechanism 104 into the fluid receptacle 106 and the step 310 of removing the fluid receptacle from the dosing mechanism 106. The fluid receptacle 106 also may be ergonomically shaped, such that the user is easily able to dispense the fluid from the fluid receptacle 106.

In this method, the container 100 may also comprise a first coding feature 110, the dosing mechanism 102 may comprise a second coding feature 112, and the fluid receptacle 104 may comprise a third coding feature 114. The user may use the coding features (for example, labels) to ensure that only the same type of fluid is present in the container, dosing mechanism, and fluid receptacle, thus preventing cross-contamination of different oil types.

IV. Conclusion

Examples given above are merely illustrative and are not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to the skilled artisan.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that, as used herein and in the appended claims, the singular forms "a," "an," and "the" include the plural reference unless the context clearly dictates otherwise. Thus, for example, a reference to "a fixture" is a reference to one or more fixtures and equivalents thereof known to those skilled in the art.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular methods, devices, and materials are described, although any methods and materials similar or equivalent to those described herein can be used in the practice or testing of the invention. The disclosures of all references and publications cited above are expressly incorporated by reference in their entireties to the same extent as if each were incorporated by reference individually.

What is claimed is:

1. A fluid dispensing system comprising:
   A container comprising an open end, wherein a fluid is provided within the container;
   A dosing mechanism associated with the container, wherein the dosing mechanism comprises a cup feature, the cup feature comprising a first region forming a base of the cup feature and a second region forming a rim of the cup feature, wherein the cup feature contains a volume of fluid and wherein, during use, a hydrostatic seal is formed by submerging the open end of the container in the volume of fluid in the first region of the cup feature; and
   A fluid receptacle, wherein the fluid receptacle is releasably engageable with the container or the dosing mechanism;
   Wherein actuating the dosing mechanism releases a dose of fluid from the container into the fluid receptacle.

2. The fluid dispensing system of claim 1, wherein the first region of the cup feature retains a volume of fluid when the open end of the container is removed.

3. The fluid dispensing system of claim 1, wherein the cup feature is provided with a piercing member disposed centrally within the cup feature in order to pierce the pierce-able membrane as the open end of the container is inserted into the dosing mechanism.

4. The fluid dispensing system of claim 1, wherein the dose of fluid is set by a user.

5. The fluid dispensing system of claim 1, wherein the dosing mechanism is connected to the open end of the container, wherein the open end of the container comprises a pierce-able membrane, and wherein the dosing mechanism punctures the pierce-able membrane when connected to the container.

6. The fluid dispensing system of claim 1, wherein the container comprises a crushable fluid reservoir.

7. The fluid dispensing system of claim 1, wherein the container is cylindrical.

8. The fluid dispensing system of claim 1, wherein the container is conical.

9. The fluid dispensing system of claim 1, wherein the container comprises at least one handle.

10. The fluid dispensing system of claim 9, wherein the dosing mechanism comprises a valve positioned between the container and the fluid receptacle, and wherein actuating a switch actuates the valve.

11. The fluid dispensing system of claim 1, wherein the container comprises an integrated measuring indicator.

12. The fluid dispensing system of claim 1, wherein the dosing mechanism comprises a non-rotatable switch.

13. The fluid dispensing system of claim 12, wherein the switch is configured to have a first position and a second position.

14. The fluid dispensing system of claim 13, wherein in the first position, the switch is configured to prevent the fluid from entering the fluid receptacle, and in the second position, the switch is configured to enable the fluid to flow into the fluid receptacle.

15. The fluid dispensing system of claim 13, wherein the switch is configured such that the fluid is dispensed only when the switch is held in the second position.

16. The fluid dispensing system of claim 12, wherein the switch is configured such that a first activation initiates the flow of fluid into the fluid receptacle, and a second activation terminates the flow of fluid into the fluid receptacle.

17. The fluid dispensing system of claim 12, wherein the switch is one of: a push-button, a rocker switch, or a sliding switch.

18. The fluid dispensing system of claim 1, wherein the dosing mechanism comprises a rotatable switch.

19. The fluid dispensing system of claim 1, wherein the dosing mechanism comprises one of: a keypad, a touch-sensitive screen, a dial, or a lock mechanism.

20. The fluid dispensing system of claim 1, wherein the container, a reservoir of the dosing mechanism, or the fluid receptacle are manufactured from an oleophobic material.

21. The fluid dispensing system of claim 1, wherein the fluid is lubricating motor oil.

22. The fluid dispensing system of claim 1, wherein the container comprises a first coding feature indicating the type of fluid provided within the container, the dosing mechanism comprises a second coding feature and the fluid receptacle comprises a third coding feature, and wherein the first coding feature, second coding feature and third coding feature match.

* * * * *